Patented Jan. 2, 1940

2,185,414

UNITED STATES PATENT OFFICE 2,185,414

PROCESS OF TREATING OILS

Robert S. McKinney, Chevy Chase, Md.; dedicated to the free use of the People of the United States of America No Drawing. Application March 29, 1938,
Serial No. 198,698

8 Claims. (Cl. 260—407)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People of the United States of America to take effect on the granting of a patent to me.

This invention relates to a new process for increasing the drying properties of the weak drying oils and semi-drying oils.

I have found that the weak drying oils, such as, soybean oil, safflower oil and linseed oil, and the semi-drying oils, such as, cottonseed oil, corn oil and kapok oil, when heated strongly in the presence of small amounts of the alkali hydroxides, such as, sodium hydroxide, potassium hydroxide and lithium hydroxide, or with small amounts of the oxides, hydroxides, or fatty acid salts of the alkaline earths, such as, barium oxide, calcium oxide and magnesium oxide, barium hydroxide, calcium hydroxide, magnesium hydroxide and calcium linolenate, barium linoleate, and magnesium oleate, yield oils which are much superior in drying properties to the original oils. Such oils when heated without the presence of any of the above-mentioned substances or their equivalents are found to change little in respect to drying properties.

In carrying out my invention, I add a small portion (about 0.1%) of the alkaline hydroxide or alkaline earth oxide, hydroxide, or fatty acid salt of an alkaline earth to the refined anhydrous oil and strongly heat the mixture at 200° C. to 250° C. for two to eighteen hours, preferably in an inert atmosphere to prevent oxidation. The oil is then allowed to cool, preferably in an inert atmosphere.

Oils of the class described when treated in this manner dry to a film dry to the touch in time when spread out in a thin layer on glass, while the original oils and oils heated in a similar manner without any of the substances above enumerated showed little evidence of drying in an equal length of time.

Having thus described my invention, I claim:

1. The process for increasing the drying properties of weak drying oils and semi-drying oils, which process comprises heating said oils at a temperature of 200° C. to 250° C. for two to eighteen hours with about 0.1% of an alkaline hydroxide.

2. The process for increasing the drying properties of weak drying oils and semi-drying oils, which process comprises heating said oils at a temperature of 200° C. to 250° C. for two to eighteen hours with about 0.1% of potassium hydroxide.

3. The process for increasing the drying properties of weak drying oils and semi-drying oils, which process comprises heating said oils at a temperature of 200° C. to 250° C. for two to eighteen hours with about 0.1% of an alkaline earth oxide.

4. The process for increasing the drying properties of weak drying oils and semi-drying oils, which process comprises heating said oils at a temperature of 200° C. to 250° C. for two to eighteen hours with about 0.1% of calcium oxide.

5. The process for increasing the drying properties of weak drying oils and semi-drying oils, which process comprises heating said oils at a temperature of 200° C. to 250° C. for two to eighteen hours with about 0.1% of a fatty acid salt of an alkaline earth.

6. The process for increasing the drying properties of weak drying oils and semi-drying oils, which process comprises heating said oils at a temperature of 200° C. to 250° C. for two to eighteen hours with about 0.1% of calcium linolenate.

7. The process for increasing the drying properties of weak drying oils and semi-drying oils, which process comprises heating said oils at a temperature of 200° C. to 250° C. for two to eighteen hours with about 0.1% of an alkaline earth hydroxide.

8. The process for increasing the drying properties of weak drying oils and semi-drying oils, which process comprises heating said oils at a temperature of 200° C. to 250° C. for two to eighteen hours with about 0.1% of calcium hydroxide.

ROBERT S. McKINNEY.